United States Patent [19]
Daughtery, III

[11] Patent Number: 5,884,286
[45] Date of Patent: Mar. 16, 1999

[54] APPARATUS AND PROCESS FOR EXECUTING AN EXPIRATIONLESS OPTION TRANSACTION

[76] Inventor: Vergil L. Daughtery, III, 203 Forestside Cir., Americus, Ga. 31709-3337

[21] Appl. No.: 718,630

[22] Filed: Sep. 17, 1996

Related U.S. Application Data

[63] Continuation-in-part of Ser. No. 282,717, Jul. 29, 1994, Pat. No. 5,557,517.

[51] Int. Cl.[6] ........................................... G06F 17/60
[52] U.S. Cl. ........................... 705/36; 705/1; 705/4; 705/35; 705/37; 273/138.2; 364/918
[58] Field of Search ........................ 705/1, 36, 37, 705/4, 35; 273/138.2; 364/918

[56] References Cited

U.S. PATENT DOCUMENTS

| | | | |
|---|---|---|---|
| 3,634,669 | 1/1972 | Soumas et al. | 705/4 |
| 4,597,046 | 6/1986 | Musmanno et al. | 705/36 |
| 4,598,367 | 7/1986 | DeFrancesco et al. | 705/36 |
| 4,674,044 | 6/1987 | Kalmus et al. | 705/37 |
| 4,766,539 | 8/1988 | Fox | 705/4 |
| 4,774,663 | 9/1988 | Musmanno et al. | 705/36 |
| 4,823,265 | 4/1989 | Nelson | 705/35 |
| 4,910,676 | 3/1990 | Alldredge | 705/37 |
| 4,942,616 | 7/1990 | Linstroth et al. | 704/275 |
| 5,003,473 | 3/1991 | Richards | 705/37 |
| 5,083,782 | 1/1992 | Nilssen | 705/35 |
| 5,101,353 | 3/1992 | Lupien et al. | 705/37 |
| 5,132,899 | 7/1992 | Fox | 705/36 |
| 5,202,827 | 4/1993 | Sober | 705/36 |
| 5,692,233 | 11/1997 | Garman | 705/36 |
| 5,721,831 | 2/1998 | Waits et al. | 395/210 |
| 5,745,383 | 4/1998 | Barber | 364/554 |
| 5,765,141 | 6/1998 | Spector | 705/14 |
| 5,774,878 | 6/1998 | Marshall | 705/35 |
| 5,774,883 | 6/1998 | Anderson et al. | 205/38 |

OTHER PUBLICATIONS

Robert C. Merton 1973 Theory of Rational Option Pricing, *Bell Journal of Economics and Management Science* 4, 141–183.

Clifford W. Smith Jr. 1990 *The Handbook of Financial Engineering*, Ch. 11, Option Pricing: A Review, pp. 255–303, Harper Business Books, U.S.A.

John C. Cox et al. 1990 *The Handbook of Financial Engineering*, Ch. 13, Option Pricing: A Simplified Approach, pp. 316–325, Harper Business Books, U.S.A.

*Primary Examiner*—Allen R. MacDonald
*Assistant Examiner*—M. Irshadullah
*Attorney, Agent, or Firm*—Troutman Sanders, LLP

[57] ABSTRACT

The present invention introduces an apparatus and process which may be implemented on a vast variety of computer systems. The apparatus and process of the present invention use a computer system to receive and store data representative of a particular asset, a type of option (call or put), requested exercise price and a multitude of other variables related to the asset. The apparatus and process then generate data representative of an expirationless option premium for use in transacting an expirationless option.

17 Claims, 12 Drawing Sheets

PURCHASED EXPIRATIONLESS CALL OPTION

PURCHASED EXPIRATIONLESS PUT OPTION

PURCHASED EXPIRATIONLESS CALL OPTION

PURCHASED EXPIRATIONLESS PUT OPTION 5,884,286

APPARATUS AND PROCESS FOR EXECUTING AN EXPIRATIONLESS OPTION TRANSACTION

CROSS-REFERENCE TO RELATED APPLICATION

This application is a Continuation-In-Part of Ser. No. 08/282,717 filed on Jul. 29, 1994 now U.S. Pat. No. 5,557,517, on Sept. 17, 1996.

BACKGROUND OF THE INVENTION

1. Technical Field

The present invention relates generally to an apparatus and process for automatically transacting an expirationless option for use in a variety of markets, such as commodities or securities markets.

2. Description of the Prior Art

An "option" is generally used to hedge risk by providing the right to purchase or sell a commodity or other asset at a later time at a set price with only limited obligations. An option is similar to an insurance policy in that it insures that an asset may be purchased or sold at a later time at a set price in return for a premium, often referred to as an option premium, which is generally a relatively small percentage of the current value of the asset. A first type of option, referred to as a "call" option in the securities market, gives the purchaser of the option the right, but not the obligation, to buy a particular asset at a later time at a guaranteed price, often referred to as the "exercise price." A second type of option, referred to as a "put" option in the securities market, gives the purchaser of the option the right, but not the obligation, to sell a particular asset at a later time at the exercise price. (The "put" option may be thought of as giving the owner the right to "put" the security into another's name at the exercise price.) In either instance, the seller of the call or put option is obligated to perform the associated transactions if the purchaser chooses to exercise its option.

For many years, options have been utilized in a variety of asset-based transactions. For example, in the commodities market, commodity producers (e.g., farmers) often enter into option relationships with commodity users (e.g., manufacturers) and speculators; in the real estate market, real estate owners often enter into option relationships with real estate purchasers; and in the securities market, security holders often enter into option relationships with security purchasers.

In an illustrative example for the commodities market, a commodity user (e.g., a cereal manufacturer) which expects that it will need a certain amount of particular commodities (e.g., corn and wheat) at a later time (e.g., in six months), may purchase a "call" option from a speculator. In return, the speculator receives the option premium in return for obligating itself to obtain and sell the set amount of corn and wheat at the exercise price six months from the time the option was granted.

Accordingly, if the price of these commodities increases over the six month period, then the cereal manufacturer will likely exercise the "call" option and obtain the set amount of commodities from the seller at the guaranteed exercise price. Therefore, by paying the option premium in advance of knowing the actual value of the commodities six months later, the cereal manufacturer may save itself a substantial amount of money, especially if the price of corn or wheat has substantially increased over the six month period due to a number of reasons (e.g., bad weather). Of course, if the price of these commodities does not reach the exercise price over the six month period, then the cereal manufacturer simply will not exercise its option and will purchase the commodities on the open market at the then going price.

On the other hand, farmers who plant their fields many months in advance of having a commodity ready for delivery and wish to guarantee themselves a set price for their commodity at a time in the future may purchase a "put" option from a speculator. Here, if the price (value) of the farmer's commodities goes down over the set period of time for a variety of reasons (e.g., exceptionally good crops among farmers), in return for the option premium, the farmer is guaranteed that it will receive a set amount of minimum income for his efforts from the speculator.

The most frequent use of options is in the securities market, where millions of options are typically transacted on a daily basis. In the securities market, investors may hedge the risk related to investing in securities associated with stocks in companies, bonds, commodities, real estate and many other assets.

Of importance, the common denominator among the variety of prior art systems for transacting asset-based options are that they are only capable of transacting options which expire after a certain period of "time". In other words, the purchaser of the call or put option using the prior art systems for handling option transactions only has the right to exercise its option before it expires or on the expiration date.

As shown in FIGS. 8–11, for a set period of time, an option transacted using a prior art system has some value associated with it depending on the type of option, the current value of the asset relative to the exercise price and other variables. However, the moment after the option expires, a purchased option, as shown in FIGS. 8 and 9, is worthless causing an option purchaser who may have owned a valuable option one day to own a worthless option the next day. Furthermore, not only is the option worthless, but the purchaser of the call or put option is no longer protected against future price fluctuations associated with the asset. On the other hand, as shown in FIGS. 10 and 11, a sold option, which might be falling in value, automatically rises to the value of the option premium and removes all future risks to the option seller the moment after the option expires.

Ignoring the effect of "time" and other nominal costs associated with transacting options, the value of the options (e.g., on shares of company A stocks) may increase or decrease based on the current price of the shares. For example, if the current share price rose from $50 to $54, then the value of the purchased call option (FIG. 8) would increase because it would be more likely to be exercised at the $55 per share exercise price. Further, if the current share price rose to $60, then the value of the purchased call option would increase even more because the owner of the purchased call option could now purchase Company A shares at the exercise price of $55 and sell them for $60 on the open market resulting in a $5 per share profit. Moreover, the value of the purchased call option would continue to increase if the current share price of the Company A shares continued to rise higher and higher. Accordingly, as long as the current price of the asset (the Company A shares) continues to increase, the profits associated with the return on investment for a purchaser of a call option are unlimited. However, as might be expected, the exact opposite results for the seller of the call option (see FIG. 10) in that the losses attributed to the seller of a call option are unlimited.

On the other hand, continuing to ignore the effect of "time," if the current share price dropped from $50 to $45, then the value of the purchased call option would decrease because it would be less likely to be exercised at the $55 per share exercise price. Moreover, as the current share price dropped further, the purchased call option would be even less likely to be exercised. However, unlike the situation above where the value of the purchased call option continued to increase as the current share price increased, for a purchased call option associated with an asset which decreases in value, the maximum loss associated with the return on investment is limited to the option premium (for this example, $5 per share). Again, the exact opposite results for the seller of the call option in that the profits realized by the seller of a call option are capped at the option premium.

Referring to FIGS. 9 and 11, similar yet opposite results may be realized by the purchaser and seller of a put option, respectively, using a prior art system for transacting options. Here, assume that investor P purchases a put option from investors who sells the put option on shares of Company A with an exercise price of $45 in six months in return for an option premium of $5 per share.

Here, again ignoring the effect of "time or other nominal costs," if the value of the Company A shares fell to $46, then the value of the purchased put option (FIG. 9) would increase because it would be more likely to be exercised. Moreover, if the value of the shares continued to fall to $40, then the value of the purchased put option would increase even more because the owner of the purchased put option would be able to obtain shares of Company A at a price of $40 per share and sell these same shares at $45 per share by exercising its put option resulting in a $5 per share profit. Accordingly, as long as the current price of the asset (the Company A shares) continue to decrease, the profits associated with the return on investment for a purchaser of a put option are limited to the exercise price (less the option premium paid) if the asset price fell to zero. However, the seller of the put option (See FIG. 12) realizes potential losses equal to the exercise price (less the option premium received) if the asset price fell to zero.

On the other hand, if the current share price increases, then the value of the purchased put option would decrease because it would be less likely to be exercised. However, regardless of how much the share price increased, the maximum loss associated with the return on investment that the purchaser of a put option would realize is limited to the option premium. In contrast, the seller of the put option realizes a maximum profit of the option premium.

Based on the above examples, it should be readily apparent that, ignoring "time," the purchaser of a call or a put option using a prior art system for transacting an option may essentially realize an unlimited gain while limiting his or her potential loss to the amount of the option premium. On the other hand, the seller of a call or a put option using the prior art system simply acts as an insurer for a period of "time" by collecting the option premium in return for insuring that the purchaser of the option will be able to buy or sell, respectively, the underlying asset at the exercise price for a certain period of "time."

However, the problem with such prior art systems is that "time" cannot be ignored. Specifically, such prior art systems limit the purchaser to purchasing call and put options only for preset increments of "time" which may or may not be a suitable amount of time to protect the purchaser and which leave the purchaser with a valueless asset after the preset increment of "time" expires.

Specifically, referring to the arrows pointed downward in FIGS. 8 and 9, even though a purchased call option may increase or a purchased put option may decrease in value as the current price of the asset increases or decreases, respectively, the value of the call or put option whose current price has yet to reach the exercise price must always battle "time." In other words, the closer that the call or put option gets to its expiration date, the more "time" will have a negative effect on the value of the purchased call or put option because "time" will be running out for the current price of the asset to reach the exercise price. Furthermore, if the current price of the asset on the expiration date is below the exercise price for the purchased call option or above the exercise price for the purchased put option, then, regardless of the current price, the option holder will (1) be left holding an option worth absolutely nothing and (2) be left unprotected in its efforts to buy or sell a particular asset at a later "time."

Therefore, a need exists for an apparatus and process for transacting an option which is not dependent on "time." In other words, a need exists for a system which transacts an expirationless option.

Of note, experts in the securities market and other markets dealing with options have concluded for many years that any system for transacting an option can only generate an option premium, which is fair to both the purchaser and seller of the option, if data representing the "time" in which the option expires is input into the system. More specifically, all algorithms that have been derived for generating fair option premiums include a variable for "time". Such algorithms include the Black-Sholes, Binomial Pricing and Analytic Approximation algorithms.

Moreover, not only is there a need for a system capable of transacting a fairly calculated premium for an option not dependent on "time," but there is a further need for such a system to automatically transact purchases and sales of expirationless options instantaneously while handling (1) the constantly changing current asset prices and other variables associated with the option premium pricing and (2) the high volume (millions) of daily options transacted in the securities market and other markets.

The above-referenced shortcomings, and other shortcoming of the prior art systems for transacting options that expire are effectively overcome by the present invention, as described in further detail below.

SUMMARY OF THE INVENTION

In accordance with the teachings of the present invention, a new computerized system for transacting expirationless options is provided. The present invention is particularly useful for transacting expirationless options in the securities market, but may be utilized in a variety of other asset-based markets.

The performance of the present invention is made possible by the existence of margin positions, which are prevalent in the securities market. A margin position is a means for an investor to purchase the right to a particular asset (e.g., security) for an indefinite (expirationless) amount of time without having to pay the entire value of the asset at the time of purchase.

An investor purchases the right to the particular asset by opening a "long" margin position or a "short" margin position. A long margin position (also referred to as a conditional purchase) is opened when the investor expects the value of the asset to increase, and a short margin position (also referred to as a conditional sale) is opened when the investor expects the value of the asset to decrease.

As shown in FIG. 12, a long margin position investor realizes a ROI equal to the current value of an asset when the investor closes the margin position less the value of the asset when he opened the margin positioned. Therefore, if the value of an asset increases from $20 to $30, then the long margin position investor realizes a $10 profit when it closes the margin position. However, if the value of the asset decreases to $5, then the same investor realizes a $15 loss.

On the other hand, as shown in FIG. 13, a short margin position investor realizes a ROI equal to the value of the asset when the investor opened the margin position less the value of the asset when it closes the margin position. Therefore, if the value of an asset decreases from $20 to $5, then the short margin position investor realizes a $15 profit when it closes the margin position. However, if the value of the asset increases to $30, then the same investor realizes a $10 loss.

A margin requirement, especially in the securities market, for a particular asset is typically substantially higher than an option premium for an expiring option on the same asset as described in the Background of the Invention. One reason for the substantial difference between the margin requirement and the option premium for an expiring option is that the entity (e.g., exchange or broker) offering the margin position essentially assumes more risk because, unlike the expiring option, the margin position does not automatically expire after a preset period of "time," (unless, of course, the underlying asset expires, such as a futures or commodity contract).

Since any expiring asset must be a derivative or represent a contingent claim, the margin position is assumed to be on the base or be a non-expiring asset. In the case of a futures contract on corn, though the margin position is actually for the futures contract which will expire, this margin requirement can be demonstrated to actually represent the margin requirement for the corn, or base asset, as well. In the prior art, a change in the futures contract is accomplished by "rolling over", or exchanging one contract for another to maintain the maximum future date of delivery or sale. The present invention will make this unnecessary.

Additionally, since, unlike an option premium, the margin requirement is essentially refundable to the investor of a margin position because the margin requirement is applied to the purchase price (current value) at the time the investor of a margin position closes the margin position, entities responsible for regulating margin positions (unscientifically) select a margin requirement balancing the demand of investors, speculators and hedgers with the protection of the respective market from default risk. These entities typically present margin requirements either as a fixed dollar amount (margin amount) associated with a particular asset or a fixed percentage (margin percentage) of the current price (value) of the particular asset.

The present invention takes advantage of the inefficiency associated with the unscientifically selected margin requirements. More specifically, the present invention is able to combine the expirationless feature of the margin position and the limited risk of the expiring option by recognizing that, because the margin requirement is unscientifically selected, a price (an option premium) exists that would cause many dealing in margin positions and expiring options to find great benefits in transacting expirationless options.

The present invention takes advantage of the unscientifically (imperfectly) selected margin requirements by recognizing a particular relationship between margin positions and options. As shown in FIG. 14, a long margin position is equivalent to a purchased expiring call option and a sold expiring put option when the effect of "time" is discounted.

Additionally, as shown in FIG. 15, a short margin position is equivalent to a sold expiring call option and a purchased expiring put option. In sum, if the effect of "time" is discounted, an entity allowing an investor to open a margin position (e.g., a long margin position), is in the same position that it would be if it simply allowed an investor to purchase an expiring option (e.g., a call) and sell an expiring option (e.g., a put).

A significant feature of the present invention is that it is able to discount the effect of "time" to allow a margin position to be equivalent to a purchased and sold option, as described above. Specifically, the present invention is able to utilize any one of the multitude of expiring option algorithms for determining fair expiring option premiums, as mentioned in the Background of the Invention, to discount the effect of "time."

All expiring option premium algorithms, in addition to including a "time" variable, include readily observable variables, such as the current value (price) of the asset, the historic price volatility of the asset (the standard deviation of the asset's historic price movement) and the current risk-free interest rate (the rate of return without default risk, such as a U.S. government T-Bill rate). Further, all expiring option premium algorithms include variables for the exercise price. Accordingly, the present invention uses the expiring option premium algorithms to discount the effect of "time" according to the following process: (1) the exercise price is set equal to the current price of the asset and (2) the option premium is set equal to the margin requirement for the asset. The present invention then uses the expiring option premium algorithm to generate the anticipated point in "time" (implied time) in which an expiring option would expire if the purchaser paid an option premium equal to the unscientifically set margin requirement of the asset and if the exercise price was equal to the current asset price (as it is for a margin position at the moment it is opened).

The present invention utilizes the above process because the exercise price is always equal to the current asset price at the moment when the margin position is opened, and this is the point in time when an investor of a margin position would gladly pay an inflated option premium equal to the margin position requirement to limit his risk. Accordingly, the present invention is able to discount "time" to price a purchased and sold option such that they are equivalent to a margin position at the point where the asset price is assumed equal to the exercise price.

After the implied time value is generated, the present invention sets the time value in the expiring option premium algorithm equal to the implied time value. The present invention then generates an expirationless option premium based on the particular exercise price selected by the investor.

The present invention may be implemented on a vast variety of computer systems. More particularly, the present invention employs a computer system to receive and store data representative of the particular asset, a type of option (call or put), a requested exercise price and the multitude of other variables related to transacting an expirationless option on the asset. Then, responsive to the data received, the present invention uses the computer system to generate data representative of an expirationless option premium, and to transact the expirationless option using the expirationless option premium.

In use, when a user wishes to purchase or sell an expirationless option, the user is prompted to input data representative of the asset, the type of option and the requested exercise price for the asset, into a keyboard or other means of the computer system. The apparatus and process of the present invention then prompt the user to enter certain other data related to transacting an expirationless option on the asset. The certain other data includes the current price for the asset on the open market, the historic price volatility of the asset, the current risk-free interest rate and the margin requirement associated with the asset. Because this data typically changes frequently, the present invention may alternatively receive this data from one or more data source (e.g., a database or real-time quote service such as S&P ComStock), connected to the computer system of the present invention. After all of the data is received, it is stored on a storage medium of the computer system.

The present invention then uses one of the expiring option premium algorithms to generate the data representative of the expirationless option premium. More specifically, the present invention temporarily sets the option premium variable of these algorithms to the margin requirement data, temporarily sets the exercise price variable of these algorithms to the current asset price data and generates data for the implied time of these algorithms. The present invention then uses the implied time data and the exercise price data input by the user to generate the data for the option premium variable of these algorithms.

The option premium data generated is the expirationless option premium used to transact the expirationless option for the particular asset. Accordingly, the option premium data is output for use in completing the expirationless option transaction.

The present invention is particularly important to those who wish to protect themselves against price swings for indefinite periods of "time." In other words, individuals and entities may now concern themselves solely with the future price of an asset, and cease concerning themselves with the seemingly impossible task of predicting the "time" in which the asset may hit that price.

For example, a cereal manufacturer whose cereal prices to its customers depend significantly on the price in which they are able to purchase wheat, can now better assure their customers of steady cereal prices by purchasing an expirationless call option using the present invention. More specifically, the cereal manufacturer can now ensure itself that it may continue to purchase wheat at or below a certain price (the exercise price), regardless of the "time" in the future when the price of wheat rises above the exercise price. Referring to FIG. 16, by utilizing the present invention, in return for the option premium, the cereal manufacturer is able to purchase an expirationless call option which has unlimited upside potential, limited downside potential (the option premium) and never becomes worthless.

On the other hand, a farmer whose family depends on being able to sell his entire crop of wheat for a set minimum price would benefit significantly. Specifically, the farmer who was unable to predict whether wheat prices might drop next year or in five years may purchase an expirationless put option using the present invention to ensure that his wheat will be purchased at a certain price (the exercise price) regardless of the "time" in the future when the price of wheat drops below the exercise price. Referring to FIG. 17, by utilizing the present invention, in return for an option premium, the farmer is able to purchase an expirationless put option which has unlimited upside potential, limited downside potential (the option premium) and never becomes worthless.

Another aspect of the present invention is that it is capable of handling constantly changing current asset prices and other variables associated with generating the option premium price and transacting the expirationless option. As described above, by using one or more data source, data from a variety of places, regardless of location, may be constantly updated and stored for use in generating the option premium price at any given moment in time.

A further aspect of the present invention is that it is capable of automatically and essentially instantaneously transacting an expirationless option in the securities market and other markets throughout the world. This is especially important in the securities market because millions of option contracts are typically transacted daily. This feature is also important because of the volatility of the variables used to generate the option premium price. This makes the essentially instantaneous transaction capability imperative, especially in the securities market.

A yet further aspect of the present invention is that it is capable of handling extinction bands. An extinction band is a price higher than the exercise price for a put option and lower than the exercise price for a call option. The extinction band price is selected because a particular entity responsible for exchange management may wish to implement expirationless options without significantly increasing recordkeeping requirements for the respective exchange. By introducing extinction bands, or forced closure of an expirationless option based not on time, but on the distance of the exercise price from the current asset price, an exchange may retain the aforementioned benefits of expirationless options for their members without significantly increasing record keeping requirements. The pricing algorithm for this variant of the expirationless option assumes that both the band, the maximum distance of the exercise price from the asset price and the extinction date (or the effective date of measurement of the exercise price from the current asset price) for these options is known. If these variables are not known, then the expirationless option with extinction bands is priced exactly as the expirationless option without extinction bands.

The aforementioned and other aspects of the present invention are described in the detailed description and attached illustrations which follow.

DETAILED DESCRIPTION OF THE INVENTION

Figure 1:
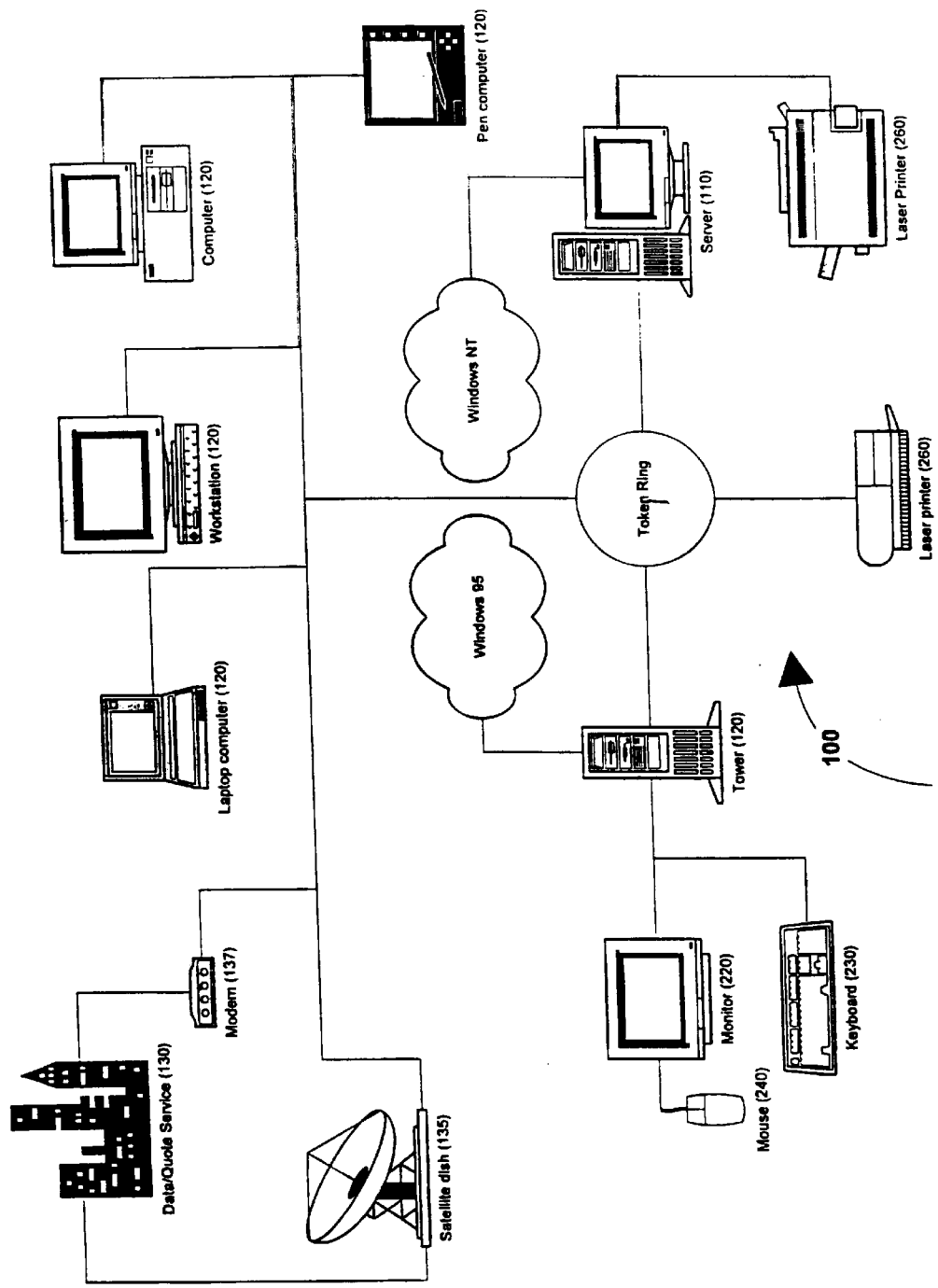
FIG. 1 depicts a diagram of a preferred computer system for implementing the present invention.

The apparatus and process of the present invention may be implemented on numerous types of computer systems, but is preferably implemented on a client/server network 100 as shown in FIG. 1. The client/server network 100 includes a server 110 connected to a plurality of clients 120, also known as end-user workstations, and a data source 130 running on a token ring environment.

Figure 2:
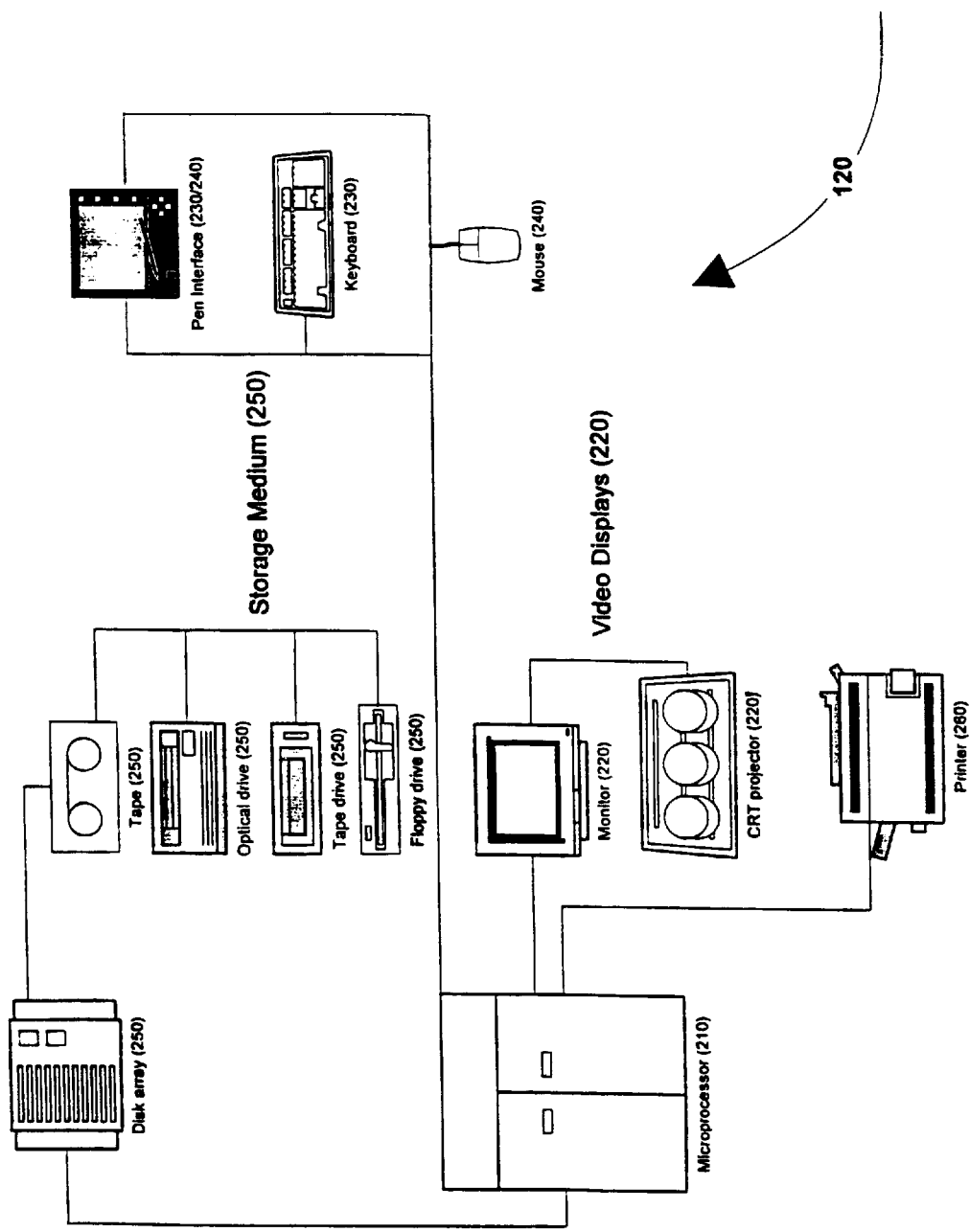
FIG. 2 depicts components of an end user workstation for the computer system of FIG. 1 for implementing the present invention.

As shown in FIG. 2, each end user workstation 120 preferably includes a microprocessor 210, a video display 220 (e.g., a CRT projector or monitor), a keyboard 230, a mouse 240, a printer 260, and a storage medium 250 (e.g., a disk array, tape, optical drive, tape drive or floppy drive). The end user workstations 120 may be an IBM compatible PC, laptop, or pen computer running Microsoft Windows 95 or its equivalent.

Figure 3:
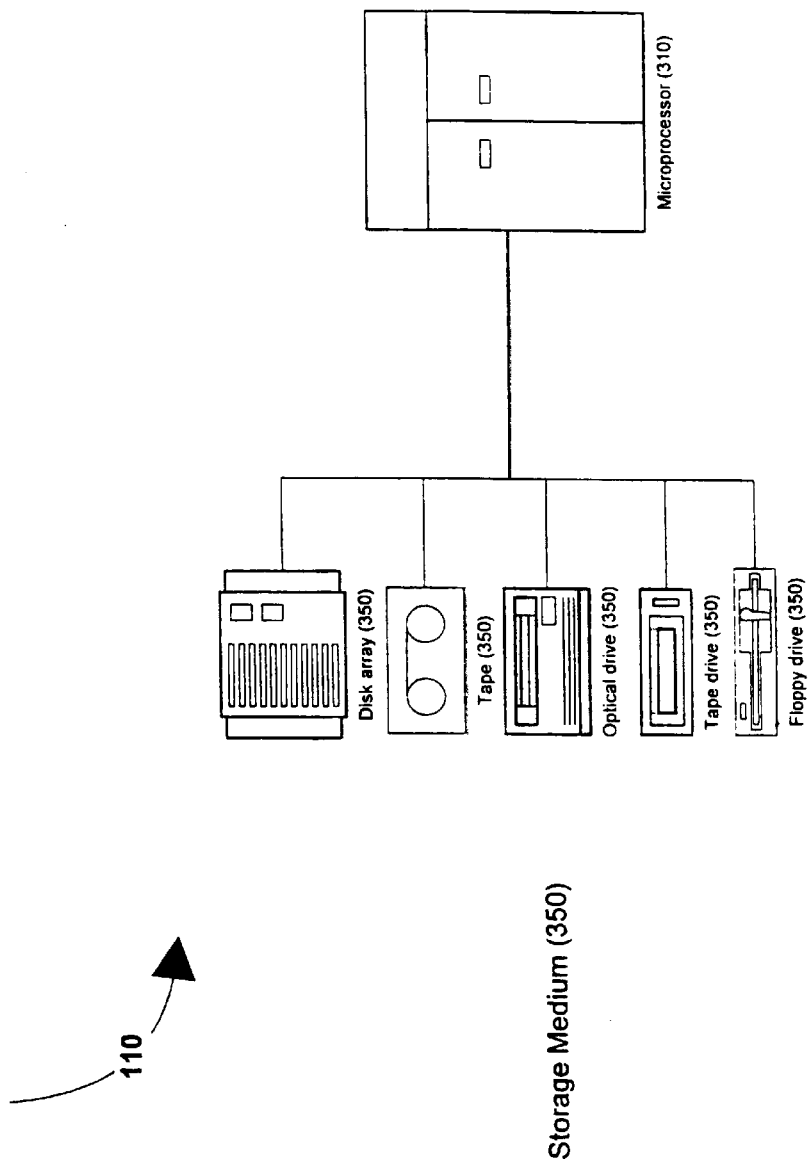
FIG. 3 depicts components of a server for the computer system of FIG. 1 for implementing the present invention.

As shown in FIG. 3, each server 110 preferably includes a microprocessor 310 and a storage medium 350. The server may use Microsoft NT or peer-to-peer with one peer dedicated as a server or their equivalent.

Data sources 130 may be a Quotron system or its equivalent, which may regularly receive data via satellite communications 135, land line connections (e.g., a modem) 137 or the like. However, any other source capable of receiving and providing data relevant to transacting the expirationless option may be used in the present invention.

The preferred client/server network of the present invention is a Windows NT PC LAN. Though these are the preferred clients, servers, and client/server networks, as may be appreciated by one of ordinary skill in the art, suitable equivalents may be used.

The following flow charts depict the operation of the present invention. In a preferred embodiment, when a user wishes to purchase or sell an expirationless option related to a particular asset, the user may view the video display 220 of the end user workstation 120 to obtain instructions on how to transact the expirationless option contract.

Figure 4:
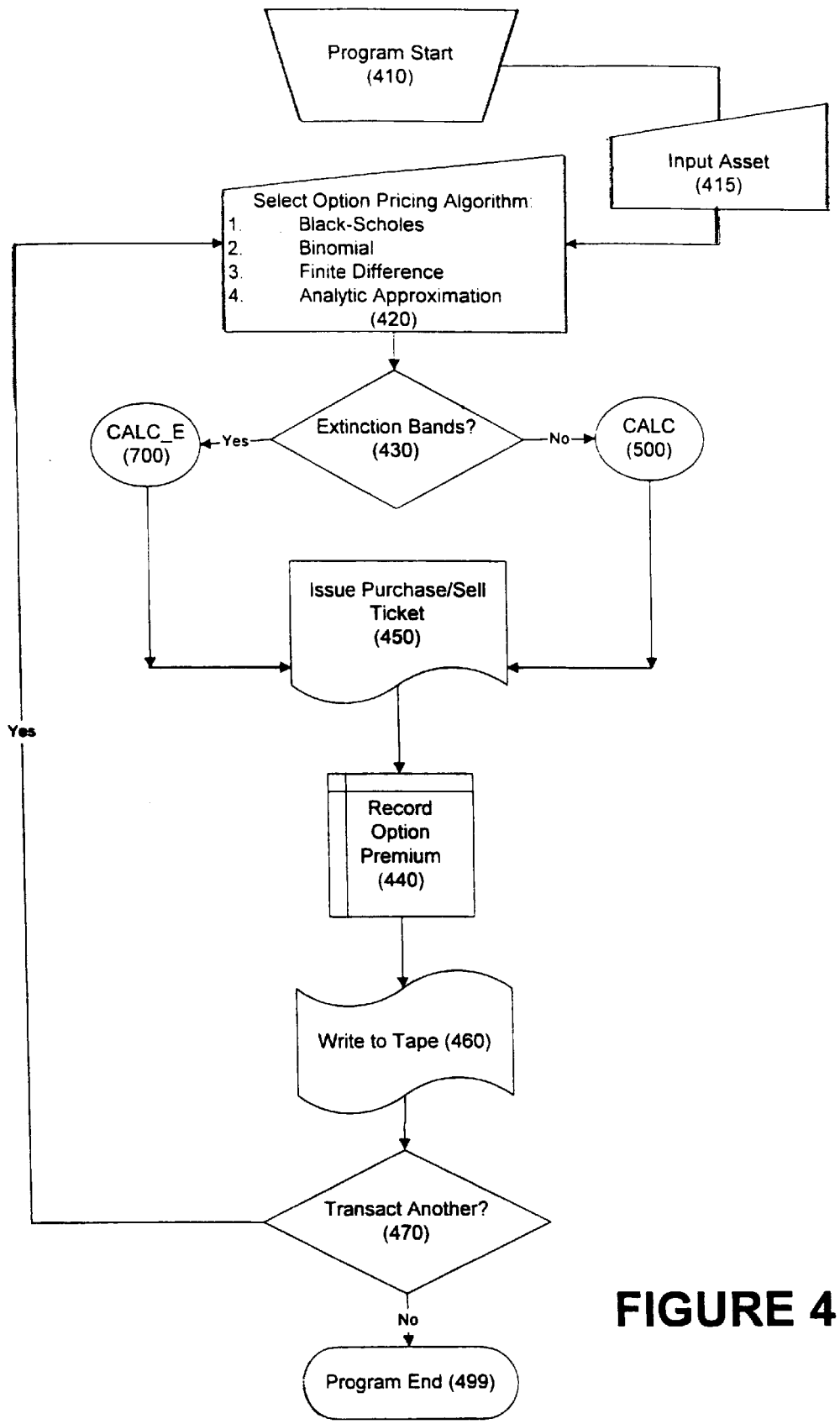
FIG. 4 depicts a flow diagram of a preferred embodiment for the Main Module of the present invention.

Referring to FIG. 4, at step 410 of the Main Module, the individual is prompted by the video display 220 to indicate when the user is ready to transact the expirationless option. By pressing the ENTER key on the keyboard 230 or clicking on a START box on the video display 220 with the mouse 240, the present invention starts its operation of transacting the expirationless option by proceeding to step 415. For simplicity purposes, it may be assumed that the microprocessor 210 of the end user workstation 120 and the microprocessor 310 of the server 110 coordinate all tasks of the end-user workstation 120 and server 110 of the computer system, respectively, and all tasks between the two.

At step 415, the video display prompts the user to input data representative of a particular asset. Upon receiving the data representative of a particular asset, the present invention proceeds to step 420.

At step 420, the video display 420 prompts the user to select which option pricing algorithm he or she wishes to use to transact the expirationless option. Such algorithms include, but are not limited to, the Black-Sholes, the Binomial Pricing, the Finite Difference and the Analytic Approximation algorithms. These algorithms are widely used in connection with determining expiring option premiums and are available in both proprietary and shareware software from Montgomery Investment Technology, which provides a price calculator to anyone with Internet access as well as extensive and rapid option pricing algorithms. The option prices provided in this detailed description were determined using this free Internet service, and demonstrate that any option pricing algorithm may be used to determine expirationless option prices. For example, the Black-Sholes algorithm is:

$$c = S \cdot \frac{\ln\left(\frac{S}{X}\right) + \left[r + \left(\frac{\sigma^2}{2}\right)\right]T}{\int_\infty \sigma\sqrt{T}} \frac{1}{\sqrt{2\pi}} e^{\frac{-z^2}{2}} dz - e^{rT}X \cdot \frac{\ln\left(\frac{S}{X}\right) + \left[r - \left(\frac{\sigma^2}{2}\right)\right]T}{\int_\infty \sigma\sqrt{T}} \frac{1}{\sqrt{2\pi}} e^{\frac{-y^2}{2}} dy$$

Where:

c=OPT_PREM=the option premium

S=ASSET_PRICE=the current price for a particular asset

X=X_PRICE=the exercise price r=T_BILL=the current risk-free interest rate

σ=VOLATLTY=the standard deviation of the historic asset price movement commonly referred to as the asset's volatility T=the time until expiration (for an expiring option)

In another example, the Binomial Pricing algorithm is:

$$c = \frac{\left[\sum_{j=0}^{n}\left(\frac{n!}{j!(n-j)!}\right)p^j(j-p)^{n-j}\max[0,u^j d^{n-j}S - K]\right]}{r^n}$$

Where:
c=OPT_PREM=the option premium
S=ASSET_PRICE =the current price for a particular asset
K=X_PRICE=the exercise price
r=T_BILL=the current risk-free interest rate
n=the number of periods (the time) until expiration (for an expiring option)

$$p = \frac{r-d}{u-d}$$

u=minimum value of an upward movement in the price of the underlying asset (e.g., $1/8^{th}$ in most stocks), and
d=minimum value of a downward movement in the price of the underlying asset ($0.0001 in most futures or commodities)

Note: u and d are generally established by the exchange and may be stored in a storage medium for access or simply input into the system on an as needed basis.

Further, as one of ordinary skill in the art would readily appreciate, other related expiring options algorithms may be used to transact an expirationless option. Upon receiving a number related to the user's selected algorithm from the keyboard 230 or the clicking the appropriate number on the video display with the mouse 240, the present invention proceeds to step 430. Of course, the present invention could be implemented to simply provide one expiring option algorithm, such that the expiring option algorithm selection step 420 may be removed entirely.

At step 430, the video display 220 prompts the user to input whether or not it wishes to include extinction bands in the expirationless option transaction. If the user selects no, then the present invention proceeds to step 500, otherwise it proceeds to step 700.

Figure 5:
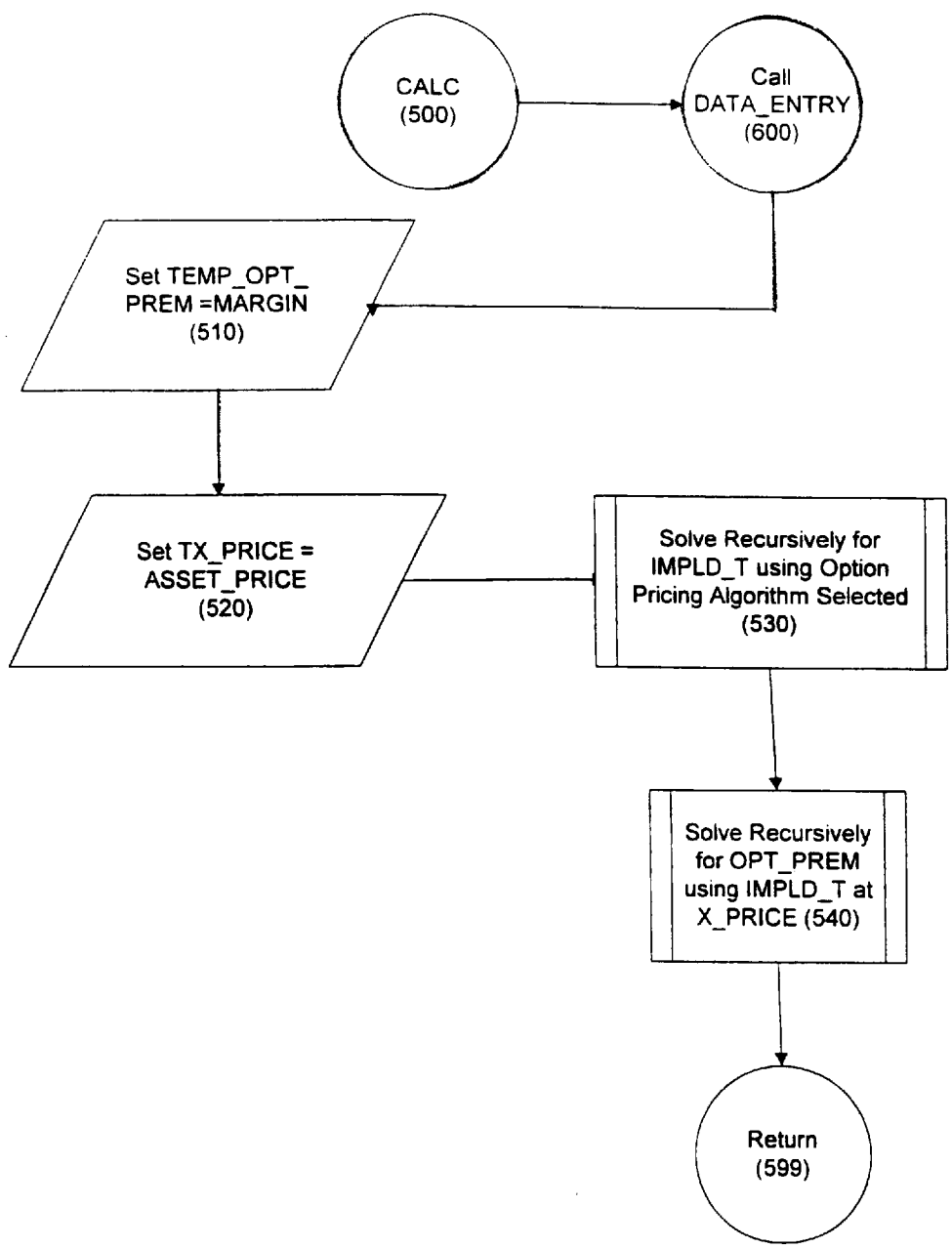
FIG. 5 depicts a flow diagram of a preferred embodiment for the CALC module of the present invention, which calculates the expirationless option premium ignoring extinction bands.

If the user decides not to include extinction bands in the transaction, then, referring to FIG. 5, the present invention proceeds to the CALC Module at step 500. The CALC Module is used to calculate the expirationless option premium ignoring extinction bands. Of course, if used exclusively in markets or on exchanges without extinction bands, step 430 may be removed entirely.

Figure 6:
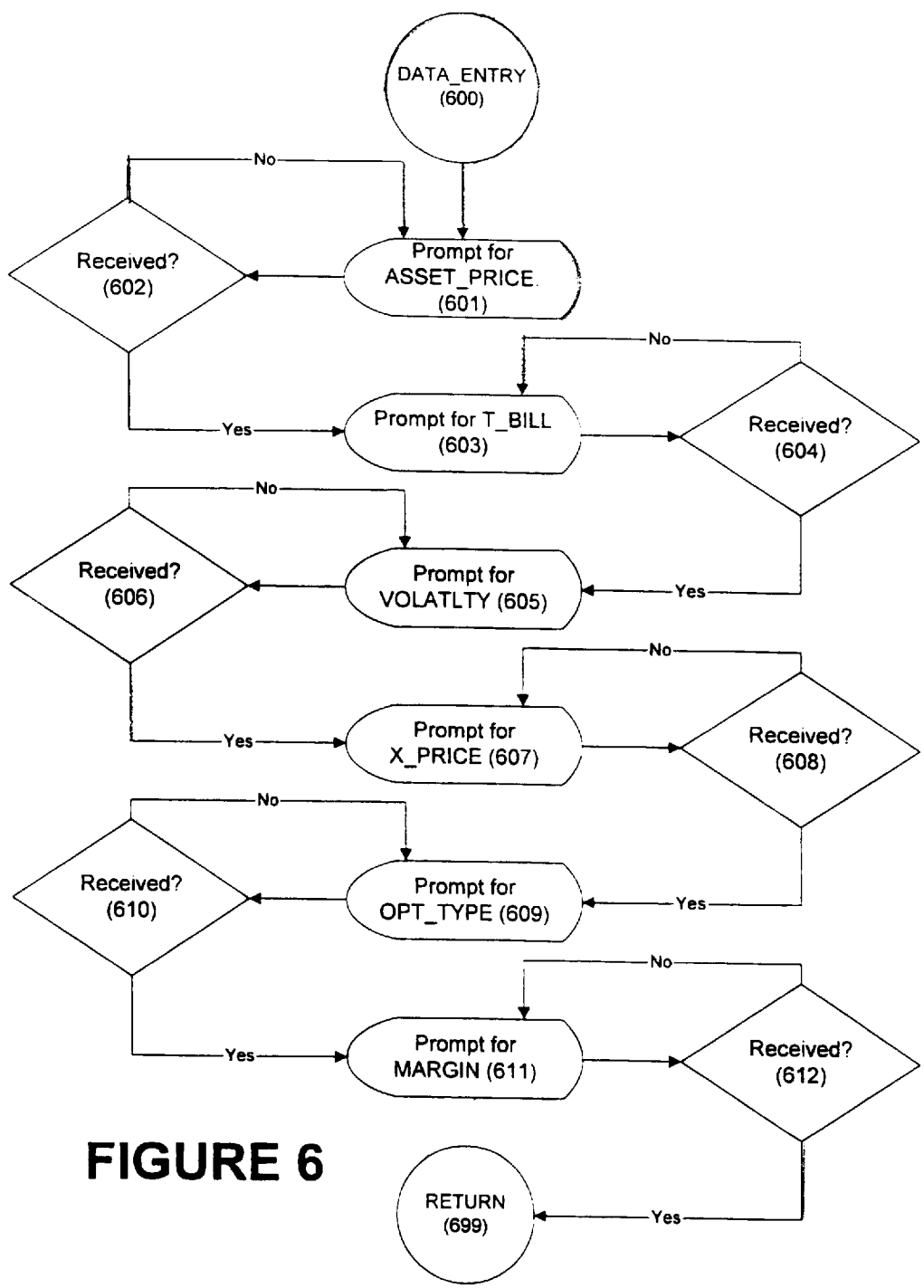
FIG. 6 depicts a flow diagram of a preferred embodiment for the DATA_ENTRY module of the present invention, which prompts the user to enter certain data for transacting the expirationless option.

The present invention then proceeds to the DATA_ENTRY Module at step 600. The DATA_ENTRY Module, as shown in FIG. 6, is used to prompt the user to input data and to accept the data input by the user.

At step 601, the video display 220 prompts the user to input the current price for the particular asset. The user may obtain the current price for the particular asset from a variety of sources, such as the data source 130. At step 602, the present invention then verifies whether the current price of the asset has been received. If not, then the present invention returns to step 601, otherwise the present invention stores the current price of the asset received under the ASSET_PRICE variable in the storage medium 250 and proceeds to step 603.

In another embodiment, steps 601 and 602 may be replaced by a step which automatically accesses the current price for the particular asset from the data source 130. In yet another embodiment, steps 601 and 602 may be replaced by a step which automatically accesses the current price for the particular asset from the storage medium 350 of the server 110 which may be updated automatically by the data source 130 or manually by an administrator of the network.

At step 603, the video display 220 prompts the user to input the current risk-free interest rate. The user may obtain the current risk-free interest rate from a variety of sources, such as the data source 130. At step 604, the present invention then verifies whether the current risk-free interest rate has been received. If not, then the present invention returns to step 603, otherwise the present invention stores the current risk-free interest rate received under the T_BILL variable in the storage medium 250 and proceeds to step 605.

In another embodiment, steps 603 and 604 may be replaced by a step which automatically accesses the current risk-free interest rate from the data source 130. In yet another embodiment, steps 603 and 604 may be replaced by a step which automatically accesses the current risk-free interest rate from the storage medium 350 of the server 110 which may be updated automatically by the data source 130 or manually by an administrator of the network.

At step 605, the video display 220 prompts the user to input the standard deviation of the price movement related to the asset known as the "historic price volatility of the asset." The user may obtain the historic price volatility of the asset from a variety of sources, such as the data source 130. At step 606, the present invention then verifies whether the historic price volatility of the asset has been received. If not, then the present invention returns to step 605, otherwise the present invention stores the historic price volatility of the asset received under the VOLATLTY variable in the storage medium 250 and proceeds to step 607.

In another embodiment, steps 605 and 606 may be replaced by a step which automatically accesses the historic price volatility of the asset from the data source 130. In yet another embodiment, steps 605 and 606 may be replaced by a step which automatically accesses the historic price volatility of the asset from the storage medium 350 of the server 110 which may be updated automatically by the data source 130 or manually by an administrator of the network.

At step 607, the video display 220 prompts the user to input the exercise price for the particular asset. At step 608, the present invention then verifies whether the exercise price of the asset has been received. If not, then the present invention returns to step 607, otherwise the present invention stores the exercise price of the asset received under the X_PRICE variable in the storage medium 250 and proceeds to step 609.

At step 609, the video display 220 prompts the user to input the option type (either a call option or a put option). At step 610, the present invention then verifies whether the option type has been received. If not, then the present invention returns to step 609, otherwise the present invention stores the option type under the OPT_TYPE variable in the storage medium 250 and proceeds to step 611.

At step 611, the video display 220 prompts the user to input the margin requirement (margin amount or margin percentage) related to the particular asset. The user may obtain the margin requirement from a variety of sources, such as the data source 130. At step 612, the present invention then verifies whether the margin requirement for the asset has been received. If not, then the present invention returns to step 611, otherwise the present invention stores the margin requirement for the asset received under the MARGIN variable in the storage medium 250 and proceeds to step 699, which returns the present invention to step 510 of the CALC Module at FIG. 5.

In another embodiment, steps 611 and 612 may be replaced by a step which automatically accesses the margin requirement from the data source 130. In yet another embodiment, steps 611 and 612 may be replaced by a step which automatically accesses the margin requirement from the storage medium 350 of the server 110 which may be updated automatically by the data source 130 or manually by an administrator of the network.

At step 510, the present invention sets the temporary option premium equal to the value of the margin requirement (MARGIN) and stores the option premium under the TEMP_OPT_PREM variable in the storage medium 250. The present invention then proceeds to step 520, where a temporary exercise price is set equal to the current price of the asset (ASSET_PRICE) and the temporary exercise price is stored under the TX_PRICE variable in the storage medium 250. The present invention then proceeds to step 530.

At step 530, the present invention determines the implied time for the expirationless option using the option pricing algorithm selected by step 420, where each option pricing algorithm will provide approximately the same implied time value. The implied time is then stored under the IMPLD_T variable in the storage medium 250. The present invention then proceeds to step 540.

At step 540, the present invention then determines the actual option premium for the expirationless option by again using the option pricing algorithm selected at step 420, the X_PRICE selected at step 607, and the implied time value (IMPL_T). The present invention then proceeds to step 440 of the Main Module at FIG. 4.

Figure 7:
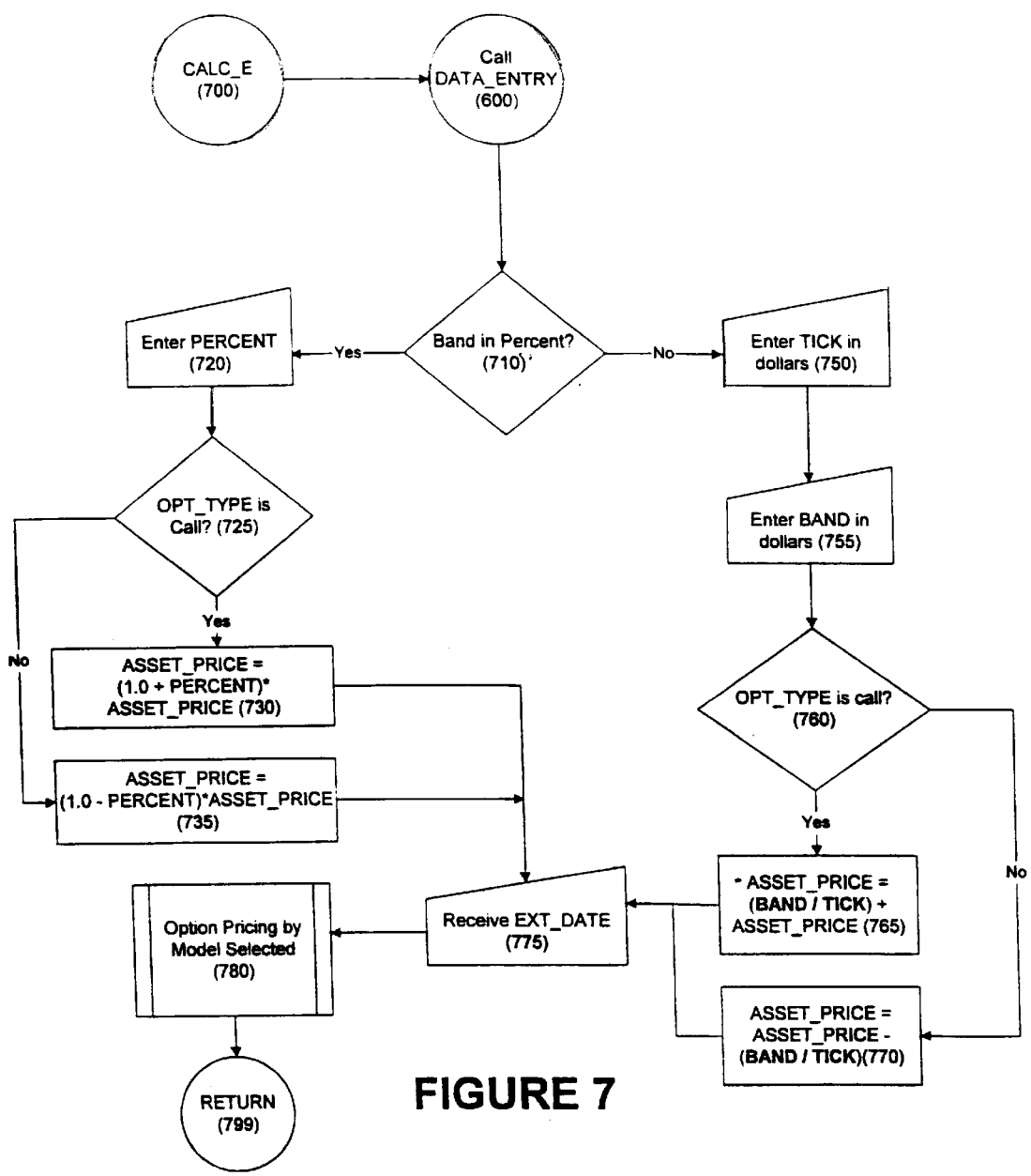
FIG. 7 depicts a flow diagram of a preferred embodiment for the CALC_E module of the present invention, which calculates the expirationless option premium with extinction bands.
Figure 8:
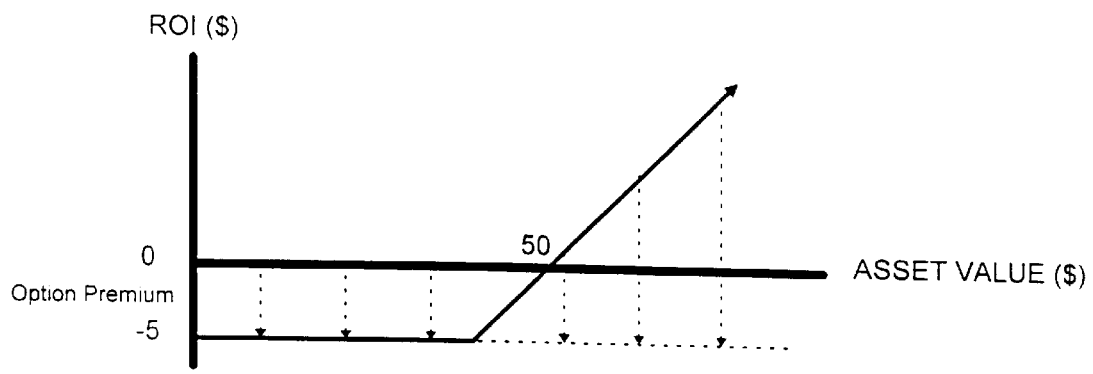
FIG. 8 depicts a graph which illustrates the potential Return on Investment (ROI) versus the Value of an Asset (Asset Value) for a purchased expiring option transacted on a prior art system.
Figure 9:
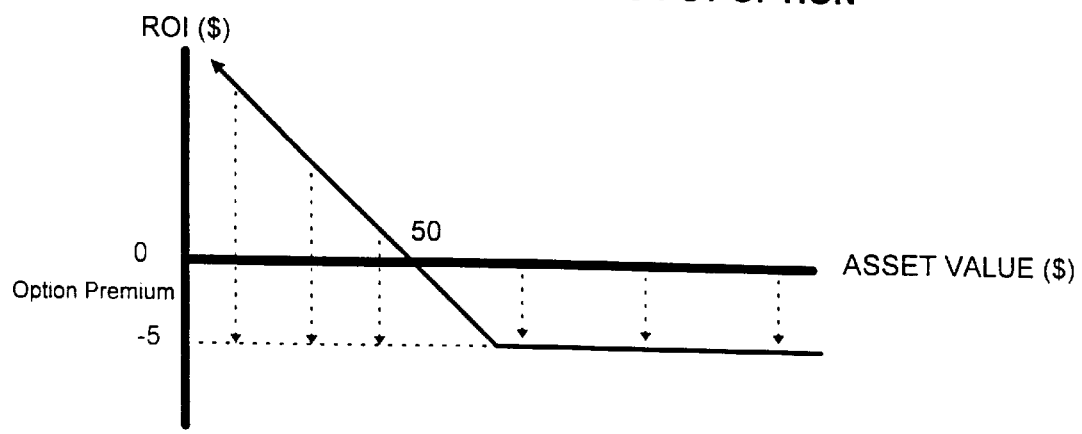
FIG. 9 depicts a graph which illustrates the potential ROI versus the Asset Value for a purchased expiring put option transacted on a prior art system.
Figure 10:
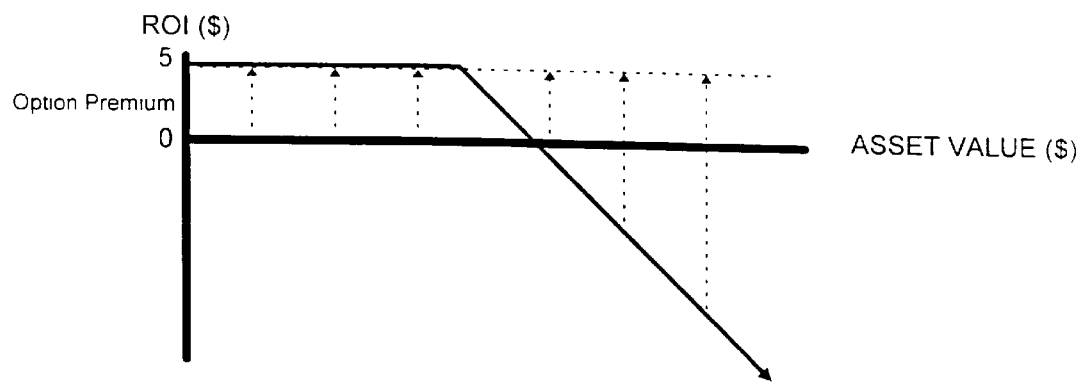
FIG. 10 depicts a graph which illustrates the potential ROI versus the Asset Value for a sold expiring option transacted on a prior art system.
Figure 11:
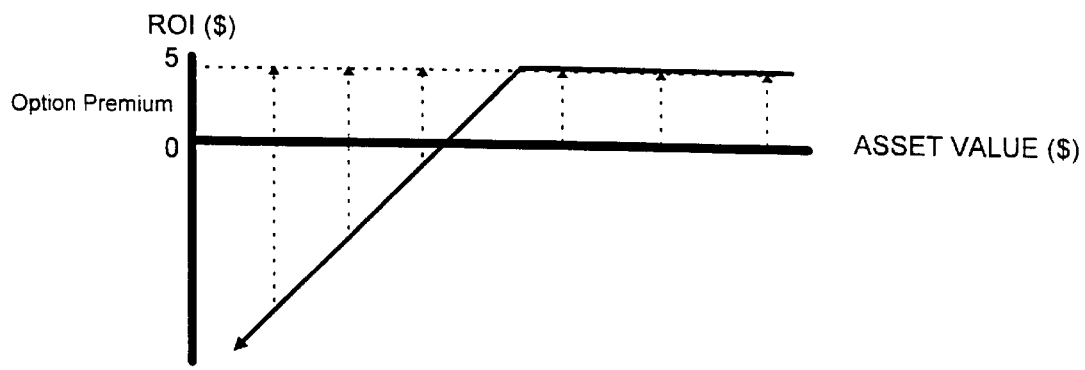
FIG. 11 depicts a graph which illustrates the potential ROI versus the Asset Value for a sold expiring put option transacted on a prior art system.
Figure 12:
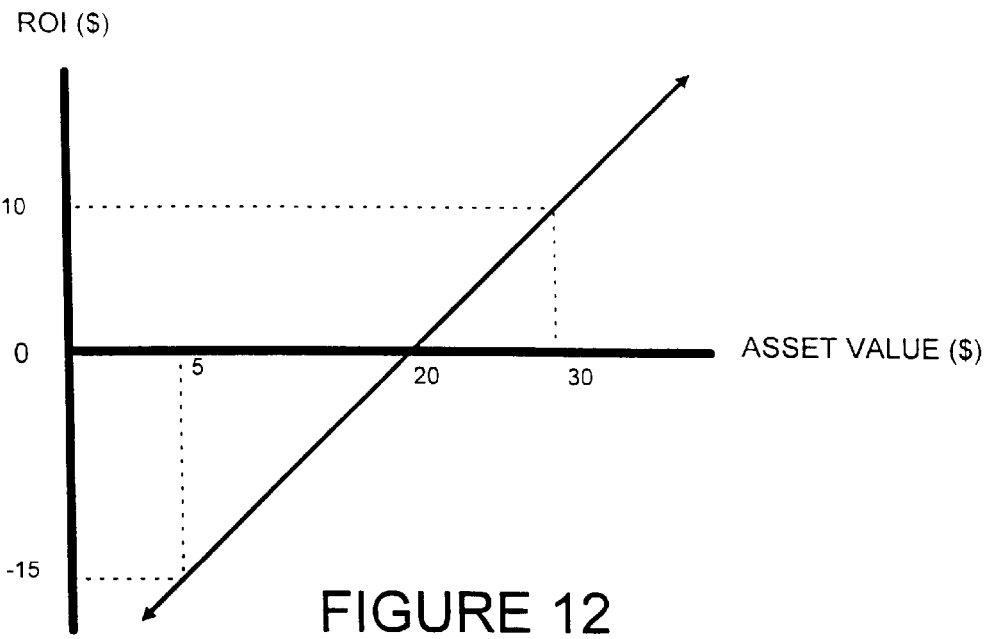
FIG. 12 depicts a graph which illustrates the potential ROI versus the Asset Value of a long margin position.
Figure 13:
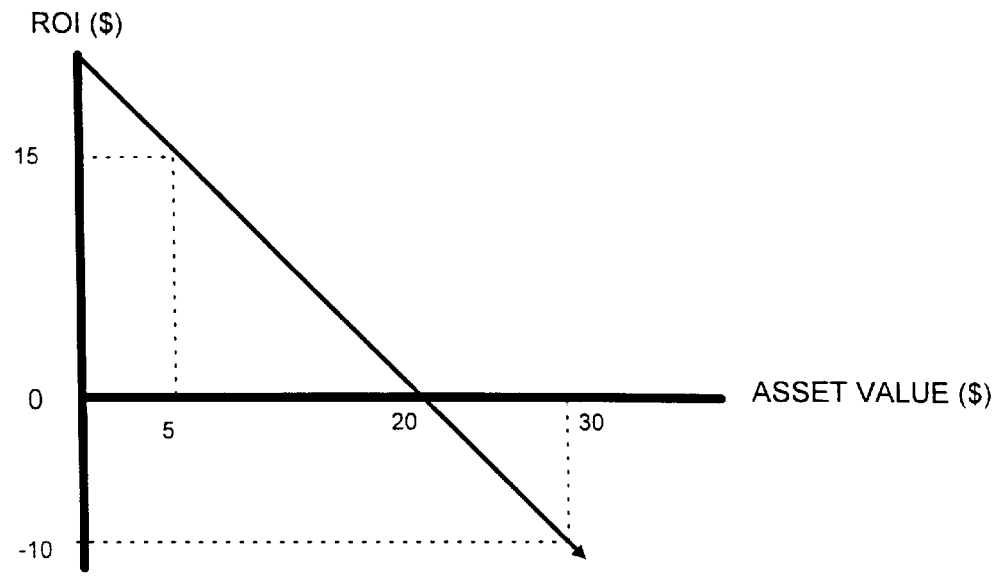
FIG. 13 depicts a graph which illustrates the potential ROI versus the Asset Value of a short margin position.
Figure 14:
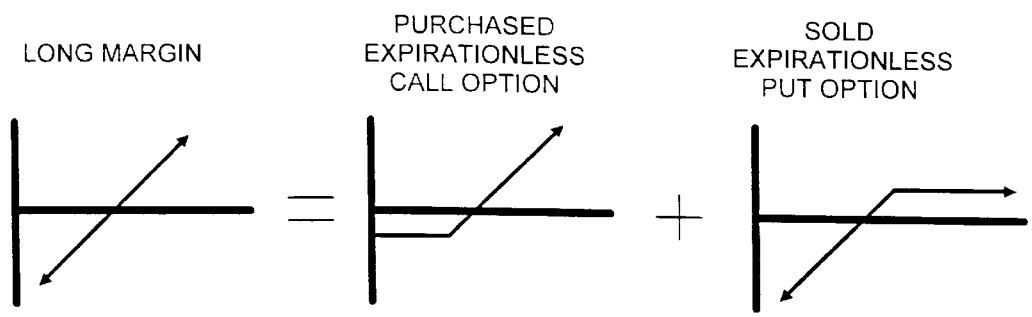
FIG. 14 illustrates the equivalent relationship between a long margin position and a purchased call expirationless option (expiring option with time discounted) plus a sold put expirationless option (expiring option with time discounted).
Figure 15:
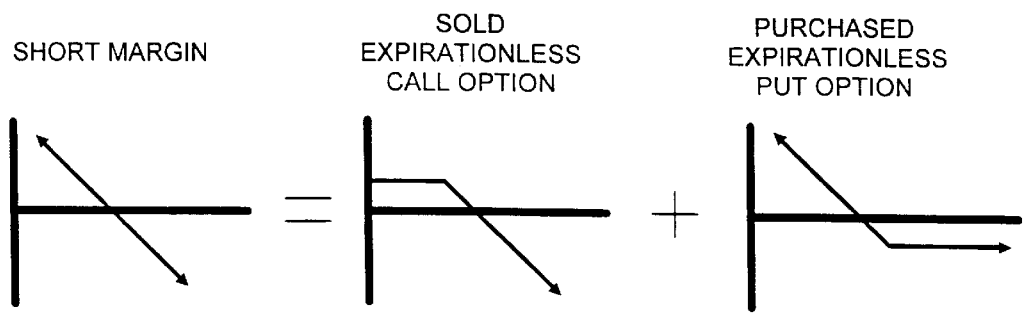
FIG. 15 illustrates the equivalent relationship between a short margin position and a sold call expirationless option (expiring option with time discounted) plus a purchased put expirationless option (expiring option with time discounted).
Figure 16:
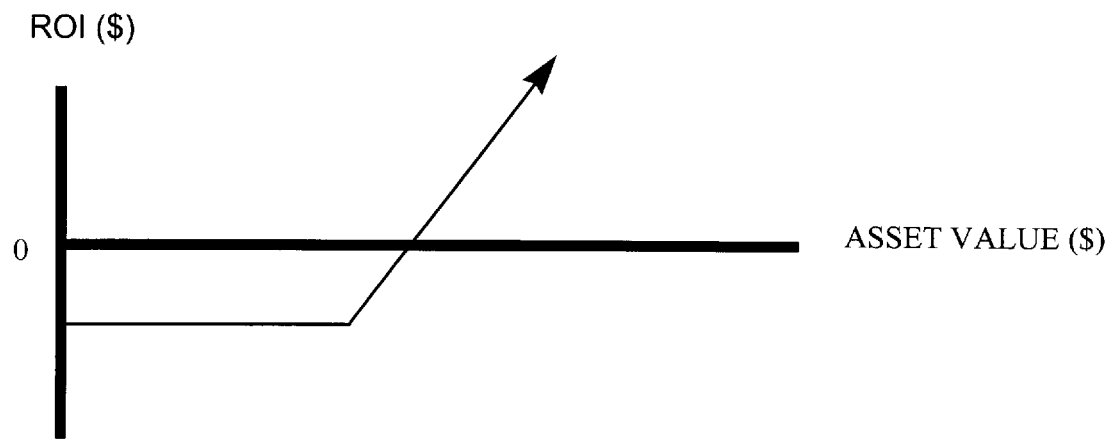
FIG. 16 depicts a graph which illustrates the potential ROI versus the Asset Value of a purchased call expirationless option transacted using the apparatus and process of the present invention.
Figure 17:
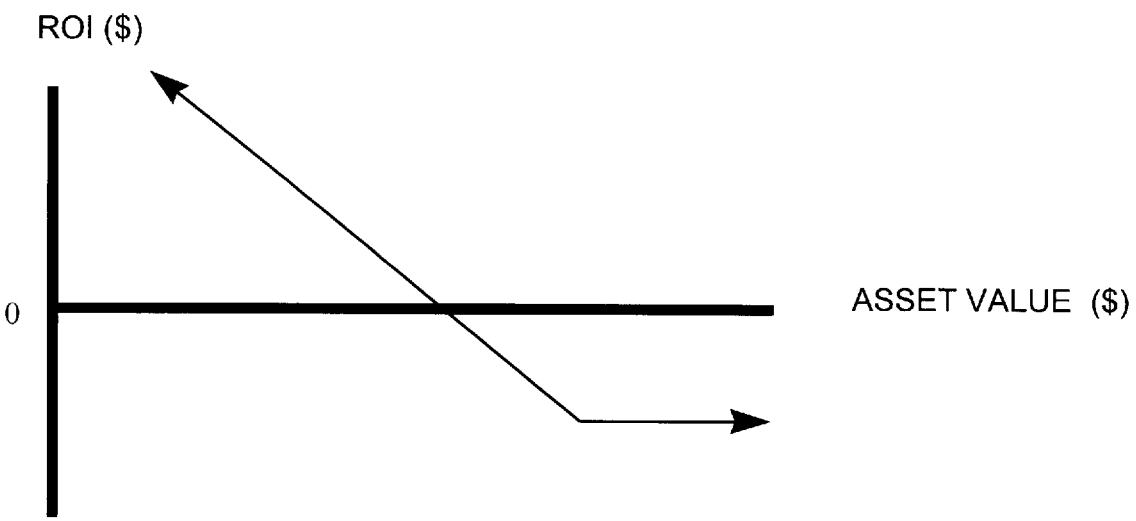
FIG. 17 depicts a graph which illustrates the potential ROI versus the Asset Value of a purchased put expirationless option transacted using the apparatus and process of the present invention.

Referring back to step 430, if the user selects to include extinction bands in the expirationless option transaction, then the present invention proceeds to the CALC_E module at step 700. Referring to FIG. 7, the CALC_E Module at step 700 calculates the expirationless option premium taking into account extinction bands.

The present invention then proceeds to the DATA_ENTRY Module at step 600. Again, the DATA_ENTRY Module, as shown in FIG. 6, is used to prompt the user to input data and to accept the data input by the user.

At step 601, the video display 220 prompts the user to input the current price for the particular asset. The user may obtain the current price for the particular asset from a variety of sources, such as the data source 130. At step 602, the present invention then verifies whether the current price of the asset has been received. If not, then the present invention returns to step 601, otherwise the present invention stores the current price of the asset received under the ASSET_PRICE variable in the storage medium 250 and proceeds to step 603.

In another embodiment, steps 601 and 602 may be replaced by a step which automatically accesses the current price from the data source 130. In yet another embodiment, steps 601 and 602 may be replaced by a step which automatically accesses the current price from the storage medium 350 of the server 110 which may be updated automatically by the data source 130 or manually by an administrator of the network.

At step 603, the video display 220 prompts the user to input the current risk-free interest rate. The user may obtain the current risk-free interest rate from a variety of sources, such as the data source 130. At step 604, the present invention then verifies whether the current risk-free interest rate has been received. If not, then the present invention returns to step 603, otherwise the present invention stores the current risk-free interest rate received under the T_BILL variable in the storage medium 250 and proceeds to step 605.

In another embodiment, steps 603 and 604 may be replaced by a step which automatically accesses the current risk-free interest rate from the data source 130. In yet another embodiment, steps 603 and 604 may be replaced by a step which automatically accesses the current risk-free interest rate from the storage medium 350 of the server 110 which may be updated automatically by the data source 130 or manually by an administrator of the network.

At step 605, the video display 220 prompts the user to input the standard deviation of the price movement related to the asset known as the "historic price volatility of the asset." The user may obtain the historic price volatility of the asset from a variety of sources, such as the data source 130. At step 606, the present invention then verifies whether the historic price volatility of the asset has been received. If not, then the present invention returns to step 605, otherwise the present invention stores the historic price volatility of the asset received under the VOLATLTY variable in the storage medium 250 and proceeds to step 607.

In another embodiment, steps 605 and 606 may be replaced by a step which automatically accesses the historic price volatility of the asset from the data source 130. In yet another embodiment, steps 605 and 606 may be replaced by a step which automatically accesses the historic price volatility of the asset from the storage medium 350 of the server 110 which may be updated automatically by the data source 130 or manually by an administrator of the network.

At step 607, the video display 220 prompts the user to input the exercise price for the particular asset. At step 608, the present invention then verifies whether the exercise price of the asset has been received. If not, then the present invention returns to step 607, otherwise the present invention stores the exercise price of the asset received under the X_PRICE variable in the storage medium 250 and proceeds to step 609.

At step 609, the video display 220 prompts the user to input the option type (either a call option or a put option). At step 610, the present invention then verifies whether the option type has been received. If not, then the present invention returns to step 609, otherwise the present invention stores the option type under the OPT_TYPE variable in the storage medium 250 and proceeds to step 611.

At step 611, the video display 220 prompts the user to input the margin requirement (margin amount or margin percentage) related to the particular asset. The user may obtain the margin requirement from a variety of sources, such as the data source 130.

At step 612, the present invention then verifies whether the margin requirement for the asset has been received. If not, then the present invention returns to step 611, otherwise the present invention stores the margin requirement for the asset received under the MARGIN variable in the storage medium 250 and proceeds to step 699, which returns the present invention to step 510 of the CALC_E Module at FIG. 7.

In another embodiment, steps 611 and 612 may be replaced by a step which automatically accesses the margin requirement from the data source 130. In yet another embodiment, steps 611 and 612 may be replaced by a step which automatically accesses the margin requirement from the storage medium 350 of the server 110 which may be updated automatically by the data source 130 or manually by an administrator of the network.

At step 710, the video display 220 prompts the user to input whether or not it wishes to determine the extinction band in percentages or in dollars. If the user selects percentages, then the present invention proceeds to step 720, otherwise it proceeds to step 750.

At step 720, the video display 220 prompts the user to input the percentage price movement to be used to determine the extinction band and the percentage is stored under the PERCENT variable in the storage medium 250. The present invention then proceeds to step 725, where it determines whether the expirationless option type (OPTION_TYPE) is a "call" or a "put". If the expirationless option is a "call," then the present invention proceeds to step 730, otherwise it proceeds to step 735.

At step 730, the current asset price (ASSET_PRICE) for the "call" option is set to the current asset price (ASSET_PRICE) multiplied by the value composed of the percentage price movement (PERCENT) plus one. On the other hand, at step 735, the current asset price (ASSET_PRICE) for the "put" option is set to the current asset price (ASSET_PRICE) multiplied by the value composed of the percentage price movement (PERCENT) minus one.

The present invention then proceeds from step 730 or step 735 to step 775. The present invention, at step 775, accesses and receives the extinction date for the particular asset (EXT_DATE) which has been set by the exchange and stored by the system administrator from the storage medium 250 or 350. Of course, the extinction date could also be manually input by the user of the present invention, who could manually input the extinction date set by the exchange each time the system is used. The present invention then proceeds to step 780.

At step 780, the present invention then determines the option premium for the expirationless option taking into account the extinction band by again using the option pricing algorithm selected at step 420 and setting the value of time until expiration in the algorithm to EXT_DATE. The present invention then proceeds to step 799.

Referring back to step 710, if the user selects to use dollars to determine the extinction band, then the invention proceeds to step 750. At step 750, the video display 220 prompts the user to input the minimum dollar amount price movement to be used to determine the extinction band, and the dollar amount price movement is stored under the TICK variable in the storage medium 250. At step 755, the present invention then sets the BAND variable to dollars.

The present invention then proceeds to step 760, where it determines whether the expirationless option type (OPTION_TYPE) is a "call" or a "put" option. If the expirationless option is a "call," then the present invention proceeds to step 765, otherwise it proceeds to step 770.

At step 765, the current asset price (ASSET_PRICE) for the "call" option is set to the current asset price (ASSET_PRICE) plus the BAND divided by the dollar amount price movement (TICK). On the other hand, at step 770, the current asset price (ASSET_PRICE) for the "put" option is set to the current price (ASSET_PRICE) minus the BAND divided by the dollar amount price movement (TICK).

The present invention then proceeds from step 765 or step 770 to step 775. The present invention, at step 775, accesses and receives the extinction date for the particular asset (EXT_DATE) which has been set by the exchange and stored by the system administrator from the storage medium 250 or 350. Of course, the extinction date could also be manually input by the user of the present invention, who could manually input the extinction date set by the exchange each time the system is used. The present invention then proceeds to step 780.

At step 780, the present invention then determines the option premium for the expirationless option taking into account the extinction band by again using the option pricing algorithm selected at step 420 and setting the value of time until expiration in the algorithm to EXT_DATE. The present invention then proceeds to step 799.

At step 799, the present invention proceeds to step 440 of the Main Module at FIG. 4, where it stores the expirationless option premium under the variable OPT_PREM at the storage medium 250. At step 450, the present invention then completes the current expirationless option transaction by issuing a buy or sell hard copy (ticket) to the user which includes the option premium and other pertinent information related to the transaction. In another embodiment, rather than issuing a buy or sell hard copy to the user, the hard copy may be issued by printing a hard copy to a buyer/seller located in the "trading pit" at the Chicago Exchange, the "desk" at the New York Exchange, or at any other similar destination of other exchanges throughout the world. Once received by a buyer/seller at an exchange, the buyer/seller may then enter the confirmation order and other information to effect the transfer of any necessary finds upon the closing of the market, as is customary. In yet another embodiment, rather than issuing a buy or sell hard copy to the user, executing the transaction may include electronically placing or transferring the transaction information into a queue of a transaction server along with other transactions. When the queued transaction is removed from the queue (i.e., by an operator or by a software program), a search for a matching order is performed (e.g., if the executed transaction is a buy, the operator or software program searches for a matching sell transaction). Thus, executing an expirationless option transaction includes issuing a hard copy to the user, issuing a hard copy to a buyer/seller at the exchange, or initiating an automatic electronic transaction. The present invention anticipates the use of these and other similar methods for executing the transaction and should not be limited to any particular method.

The present invention then proceeds to step 470, where the video display 220 prompts the user to determine whether it wishes to transact another expirationless option. If yes, then the present invention proceeds to step 420, where the user is again prompted by the video display 220 to select an option pricing algorithm. If no, then the present invention proceeds to step 499, where it ends the expirationless option transactions for the current user.

Of note, the preferred embodiment of the present invention assumes that, even though they may not be in actuality, the interest rates and dividend yield associated with each particular asset (e.g., a stock, bond, etc.) are zero. The reason for the assumption is that algorithms used in connection with pricing the underlying asset already factor the interest rate and dividend yield into the asset price. These algorithms may be either mathematical, inductive or both. Accordingly, the present invention for transacting an expirationless options using the same algorithms used for expiring options factors the interest rate and dividend yield into the option premium, but at a value of zero to ensure both the call and the put option at S=X have a price equal to the margin requirement.

The following examples illustrate the time/cost relationship between expiring options, premiums, expirationless options and margin requirements. Both examples assume a margin requirement of 25%, a current asset price of 50, a historic price volatility of 35%, and a current risk-free interest rate of 6%. Thus, using Black-Sholes algorithm, an implied time of 1210.09 days is derived.

The first example assumes a call option with an exercise price of $60 is requested by the investor.

| Time to Expiration | Expiring Option Premium | Expirationless Option Premium | Margin Requirement |
| --- | --- | --- | --- |
| Six Months | 2.15 | 9.29 | 12.5 |
| One Year | 4.59 | 9.29 | 12.5 |
| Eighteen Months | 6.65 | 9.29 | 12.5 |
| Two Years | 8.56 | 9.29 | 12.5 |
| Three Years | 11.87 | 9.29 | 12.5 |
| Five Years | 16.63 | 9.29 | 12.5 |
| Ten Years | 27.04 | 9.29 | 12.5 |

The second example assumes a put option with an exercise price of $40 is requested by the investor.

| Time to Expiration | Expiring Option Premium | Expirationless Option Premium | Margin Requirement |
| --- | --- | --- | --- |
| Six Months | 0.85 | 6.91 | 12.5 |
| One Year | 1.78 | 6.91 | 12.5 |
| Eighteen Months | 2.45 | 6.91 | 12.5 |
| Two Years | 2.96 | 6.91 | 12.5 |
| Three Years | 3.66 | 6.91 | 12.5 |
| Five Years | 4.29 | 6.91 | 12.5 |
| Ten Years | 4.45 | 6.91 | 12.5 |

What has been described above is a preferred embodiment of the present invention. It is of course not possible to describe every conceivable combination of components or methodologies for purposes of describing the present invention, but one of ordinary skill in the art will recognize that many further combinations and permutations of the present invention are possible. For example, expirationless options may be used in constructing any combination or permutation of expiring options currently used. These include Asian, or average price/rate and strike options; Barrier, which are knock-out or knock-in with and without rebate; Binary, including binary barrier, all-or-none and gap; Chooser, which is an option to choose a put or call in the future; Compound, an option on an option; Crack/Spread, or an option on the distance between prices of two assets; Currency Translated, or foreign exchange options translated into another currency; Jump, pricing using a jump-diffusion process; Lookback, or option based on minimum or maximum price within a certain period; Rainbow, or option on the minimum or maximum of two assets; options on U.S. or foreign "stripped" government securities divided into two or more instruments of principal and interest or price and dividend, likewise options on stripped corporate, agency, and municipal securities, notes, bills and Certificates of Deposit; options on Callables; or securities callable at premium or discount; and options on Odd-First, -Last, -Middle, or securities with varying coupon/dividend periods. Though certainly not limited to only these options, this list provides a clear example of the breadth of application of Expirationless American Options. Also, even though the present invention has been described substantially in terms of utilizing the margin requirement of a margin position in the securities market, equivalents to the margin requirement in other, markets (e.g., earnest money in the real estate market) may be utilized. Further, even though the preferred embodiment of the present invention is described assuming that the margin requirement on the underlying security is equal for both the long and short positions, this need not be the case. Specifically, even in cases where the margin position requirements are different, it should be obvious to one of the ordinary skill in the art that the present invention can be used to determine the expirationless option premiums comprising each respective position by using the long position margin requirement for purchasing expirationless call options and selling expirationless put options, while using the short position margin requirement for purchasing expirationless put options and selling expirationless call options. All such possible modifications are to be included within the scope of the claimed invention, as defined by the appended claims below.

I claim:

1. A data processing apparatus for executing an expirationless option transaction on a particular asset, said data processing apparatus comprising:
   (A) means for receiving data representative of a particular asset, an option type, an exercise price for the particular asset, the current price of the particular asset, the historic price volatility of the particular asset and the margin requirement for the particular asset;
   (B) a storage medium adapted to store the data received by said receiving means and an expiring option premium algorithm;
   (C) means, responsive to the data received by said receiving means, for generating data representative of an option premium for the expirationless option on the asset using the expiring option premium algorithm;
   (D) means for outputting the option premium data; and
   (E) means for executing the expirationless option transaction.

2. The data processing apparatus of claim 1, further comprising a means for inputting at least part of the data received by the receiving means.

3. The data processing apparatus of claim 2, said inputting means selected from the group consisting of: a keyboard and a mouse.

4. The data processing apparatus of claim 1, further comprising one or more data source for sending at least part of the data to the receiving means.

5. The data processing apparatus of claim 1, said outputting means selected from the group consisting of: a video display and a printer.

6. A process of operating a computer system for executing an expirationless option transaction, said process comprising the steps of:
   (A) prompting a user to input data representative of a particular asset;
   (B) receiving a first signal from the user, wherein said first signal is representative of data for the particular asset;
   (C) prompting the user to input data representative of an option type;
   (D) receiving a second signal from the user, wherein said second signal is representative of data for the option type;
   (E) prompting the user to input data representative of an exercise price for the particular asset;
   (F) receiving a third signal from the user, wherein said third signal is representative of data for the exercise price for the particular asset;
   (G) receiving a fourth signal from a data source or the user, wherein said fourth signal is representative of data related to the current price for the particular asset, the current risk-free interest rate, the historic price volatility for the particular asset and the margin requirement for the particular asset;
   (H) in response to said first, second, third and fourth signals and using an expiring option premium algorithm;

(i) setting each variable of the option premium algorithm to its associated data value received in steps (B) and (G),
(ii) setting the exercise price variable equal to the current price for the particular asset data from said fourth signal,
(iii) setting the option premium variable equal to the margin requirement for the particular asset data, and
(iv) generating data representative of an implied time;
(I) using the expiring option premium algorithm:
(i) setting the exercise price variable equal to the exercise price data of said third signal, and
(ii) generating data representative of an option premium for use in transacting the expirationless option; and executing the expirationless option transaction.

7. The process of claim 6, wherein said second signal is representative of data for the option type selected from the group consisting of: a put or a call.

8. The process of claim 6, Further comprising the step of: recording the option premium data on a storage medium.

9. The process of claim 6, further comprising the step of: outputting the option premium data.

10. A process of operating a computer system for an expirationless option transaction, said process comprising the steps of:
(A) prompting a user to input data representative of a particular asset;
(B) receiving a first signal from the user, wherein said fist signal is representative of data for the particular asset;
(C) prompting the user to input data representative of an option type;
(D) receiving a second signal from the user, wherein said second signal is representative of data for the option type;
(E) prompting the user to input data representative of an exercise price for the particular asset;
(F) receiving a third signal from the users, wherein said third signal is representative of data for the exercise price for the particular asset;
(G) receiving a fourth signal from a data source of the user, wherein said fourth signal is representative of data related to the current price for the particular asset, the current risk-free interest rate, the historic price volatility for the particular asset and the extinction date for the particular asset; and
(H) in response to said first, second, third and fourth signals and using an expiring option premium algorithm:
(i) setting each variable of the option premium algorithm to its associated data value received in steps (B), (F) and (G),
(ii) setting time variable equal to the extinction date for particular asset data from said fourth signal, and
(iii) generating data representative of an option premium; and
(I) executing the expirationless option transaction.

11. The process of claim 10, wherein said second signal is representative of data for the option type selected from the group consisting of: a put or a call.

12. The process of claim 11, wherein said fourth signal is further representative of data related to a percentage for an extinction band, and wherein step (H), prior to substep (iii), further comprises the step of setting the asset price variable equal to the percentage data plus one times the current price for the particular asset data if the option type is a call or setting the asset price variable equal to one minus the percentage data times the current price for the particular asset data if the option type is a put.

13. The process of claim 11, wherein said fourth signal is further representative of data related to a dollar amount tick for an extinction band and a dollar amount for the extinction band, and wherein step (H), prior to substep (iii), further comprises the step of setting the asset price variable equal to the extinction band data divided by the tick data plus the current price for the particular asset data if the option type is a call or setting the asset price variable equal to the current price for the particular asset data minus the extinction band data divided by the tick data if the option type is a put.

14. The process of claim 10, further comprising the steps of:
recording the option premium data on a storage medium.

15. The process of claim 10, further comprising the step of:
outputting the option premium data.

16. A process for executing an expirationless option financial
(A) prompting a user to input data representative of a particular asset;
(B) receiving a first signal from the user, wherein said first signal is representative of data for the particular asset;
(C) prompting the user to input data representative of an option type;
(D) receiving a second signal from the user, wherein said second signal is representative of data for the option type;
(E) prompting the user to input data representative of an exercise price for the particular asset;
(F) receiving a third signal from the user, wherein said third signal is representative of data for the exercise price for the particular asset;
(G) receiving a fourth signal from a data source or the user, wherein said fourth signal is representative of data related to the current price for the particular asset, the current risk-free interest rate, the historic price volatility for the particular asset and the margin requirement for the particular asset;
(H) in response to said first, second, third and fourth signals and using an expiring option premium algorithm:
(i) setting each variable of the option premium algorithm to its associated data value received in steps (3) and (G),
(ii) setting the exercise price variable equal to the current price for the particular asset data from said fourth signal,
(iii) setting the option premium variable equal to the margin requirement for the particular asset data, and
(iv) generating data representative of an implied time;
(I) using the expiring option premium algorithm:
(i) setting the exercise price variable equal to the exercise price data of said third signal, and
(ii) generating data representative of an option premium; and
(j) executing the expirationless option transaction.

17. An expirationless option financial transaction performed by the process of:
(A) prompting a user to input data representative of a particular asset;
(B) receiving a first signal from the user, wherein said first signal is representative of data for the particular asset;

(C) prompting the user to input data representative of an option type;

(D) receiving a second signal from the user, wherein said second signal is representative of data for the option type;

(E) prompting the user to input data representative of an exercise price for the particular asset;

(F) receiving a third signal from the user, wherein said third signal is representative of data for the exercise price for the particular asset;

(G) receiving a fourth signal from a data source of the user, wherein said fourth signal is representative of data related to the current price for the particular asset, the current risk-free interest rate, the historic price volatility for the particular asset and the extinction date for the particular asset;

(H) in response to said first, second, third and fourth signals and using an expiring option premium algorithm:
  (i) setting each variable of the option premium algorithm to its associated data value received in steps (B), (F) and (G),
  (ii) setting time variable equal to the extinction date for particular asset data from said fourth signal, and
  (iii) generating data representative of an option premium; and (I) executing the expirationless option transaction.

* * * * *